United States Patent Office 3,513,154
Patented May 19, 1970

3,513,154
DISAZO DYESTUFFS CONTAINING A DIAZOTIZED METHYL OR METHOXY - p - CHLOROANILINE COUPLED WITH AN N,N' - (POLYHALO - p-PHENYLENE)-BISACETOACETAMIDE
Jack L. Towle, East Cleveland, Anton Mudrak, Broadview Heights, and Vernon J. Weir, Parma, Ohio, assignors to Kewanee Oil Company, Bryn Mawr, Pa., a corporation of Delaware
No Drawing. Continuation-in-part of application Ser. No. 441,293, Mar. 19, 1965. This application Dec. 19, 1966, Ser. No. 602,530
Int. Cl. C09b 31/02, 33/14
U.S. Cl. 260—176  6 Claims

ABSTRACT OF THE DISCLOSURE

This invention comprises disazo dyestuffs of improved light-fastness, tinctorial strength and resistance to bleeding prepared by the coupling of a 4-chloroaniline derivative, having either a methyl or methoxy radical in the 2-position and either hydrogen or a methyl radical in the 5-position, with a N,N'-(polyhalo-p-phenylene)-bisacetoacetamide having 2–4 chlorine or bromine atoms attached to the phenylene nucleus.

---

This application is a continuation-in-part of application Ser. No. 441,293, filed Mar. 19, 1965, now abandoned.

This invention relates to novel disazo dyestuffs useful for dyeing a variety of fabrics, plastics and especially when incorporated with viscose rayon and acetate rayon. More specifically it relates to an improved dyestuff prepared by the coupling of a methyl or methoxy derivative of p-chloroaniline with a polychlorinated derivative of N,N'-(p-phenylene)-bisacetoacetamide.

It is an object of this invention to provide greenish to reddish-yellow dyestuffs which are pigments having, in addition to light-fastness and high tinctorial strength, the excellent property of non-bleeding in organic solvents such as acetone, xylene, tetrachloroethylene, dioctylphthalate, methanol and the like.

The problem of bleeding is attributed to the solubility of the dyestuff in an organic solvent. It is of a particular importance, therefore, to produce a dyestuff that is inert and resistant to the action of organic solvents. For example, inertness to tetrachloroethylene is important in the dry-cleaning of fabrics; insolubility in acetone is desirable in the spin dyeing of acetate rayon; resistance to dioctylphthalate is important because of its use as a plasticiser for many plastics. Moreover, insolubility in aromatic and other organic solvents is highly desirable when they are incorporated in paints.

Acylacetic acid arylides having the general formula

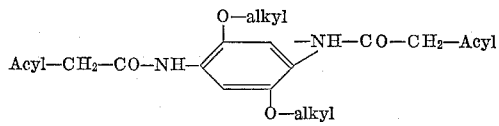

have previously been suggested as coupling components for producing azo dyestuffs because they are capable of being coupled in two positions, and when so coupled with diazo components derived from amines of the naphthalene or benzene series, it was contended by the patentee that good yellow or orange to brown dyestuffs are produced. See, in this connection, U.S. Letters Pat. 2,591,470 granted Apr. 1, 1952 to Schmid et al. However, the suggested procedure has led to inconsistent and in some instances most unsatisfactory results with respect to light fastness, resistance to bleeding in various solvents, and other desirable properties.

It has now been discovered that yellow dyestuffs which are pigments and which exhibit excellent fastness to light as well as to solvents, including powerful organic solvents, such for example as acetone, may be prepared by coupling very specific components comprising specific polyhalogenated derivatives of N,N'-(p-phenylene)bisacetoacetamide with specific methyl or methoxy derivatives of p-chloroaniline. These new dyestuffs differ in important respects and possess surprisingly superior properties as compared with those produced heretofore.

According to this invention the pigments are prepared by coupling a diazotized aniline of the structure

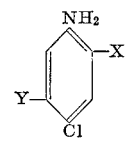
I wherein X is methyl or methoxy radical and Y is hydrogen or methyl radical, with a "coupling component" of the structure

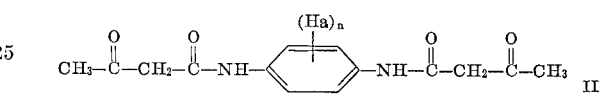
II wherein Ha is chlorine or bromine and n is 2–4 inclusive. The corresponding preferred 2,5-dichloro derivative is identified hereinafter as IIa.

The dyestuffs of this invention have the formula

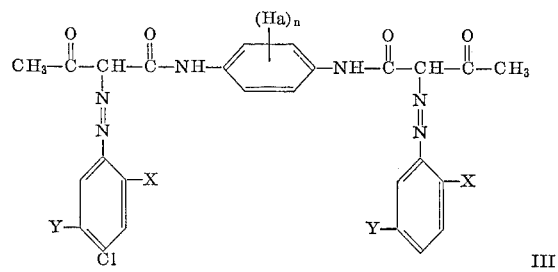
III wherein Ha, n, X and Y are as defined above.

For instance, the particularly preferred dyestuff of this invention having a brilliant yellow hue is represented by the following formula

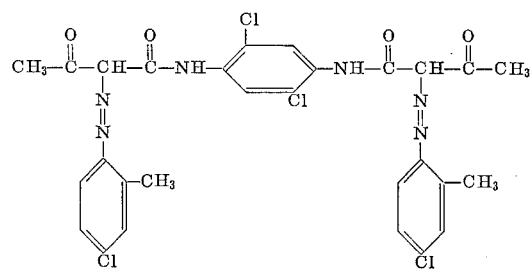
IV

This compound will not bleed in xylene, acetone, dioctylphthalate, tetrachloroethylene, and methanol, even at the boiling temperatures of these solvents. By way of comparison, the well-known commercially utilized yellow dyestuff prepared by coupling diazotized 2-methyl-4-chloroaniline with 2,5-dimethoxy-4-chloroacetoacetanilide bleeds in acetone, tetrachloroethylene, and xylene. Also, this product of the present invention is much more light fast than this well known commercial dyestuff.

Another preferred dyestuff of this invention is represented by the following formula

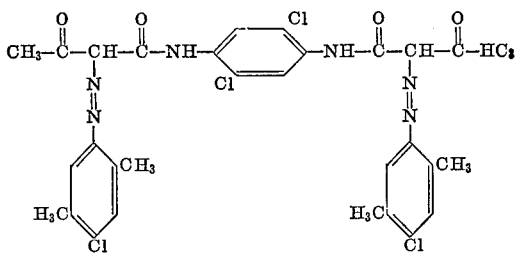

which is a reddish-yellow pigment having remarkable tinctorial strength and good light-fastness. Moreover, this pigment will not bleed in acetone, xylene, methanol, dioctylphthalate and tetrachloroethylene, even at the boiling points of these solvents.

Another preferred pigment is represented by the following formula

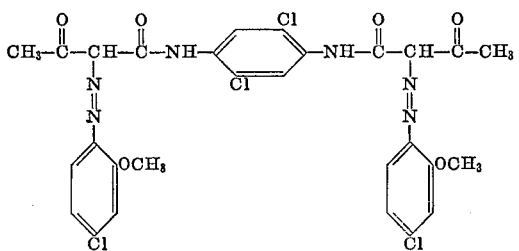

which possesses comparable properties to V.

The dyestuffs of the present invention are suprisingly good when compared with various other dyestuffs of related structures. For instance, if 2-methyl-5-chloranilino is used instead of 2-methyl-4-chloroaniline in coupling as above with N,N' - (2,5-dichloro-p-phenylene)-bis-acetoacetamide, a yellow dyestuff is obtained that is poor insofar as lightfastness is concerned. Also, dyestuffs derived from various other diazotized amines, such as 2-nitro-4-methylaniline or 2-nitro-4-chloroaniline coupled with N,N'-(2,5-dichloro-p-phenylene)-bis-acetoacetamide, bleed appreciably in various organic solvents despite the fact that their relatively high molecular weight would lead one to predict that they would be satisfactory in this respect. When the diazo derivative of 2-methyl-4-chloroaniline is coupled with N,N'-(p-phenylene)-bis-acetoacetamide or with N,N'-(2-chloro-p-phenylene)-bis-acetoactamide, yellow dyestuffs are obtained which possess very poor resistance to solvents.

By way of further comparison the pigments of the present in vention are superior to seemingly analogous dyestuffs that utilize the same diazotized amine but not having the benzene ring of the "coupling component" substituted as in the present invention. Reference is made to U.S. Pat. No. 2,591,470 which discloses a coupling component of the formula

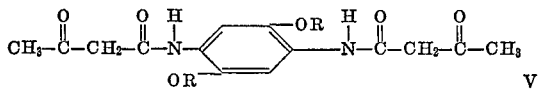

wherein R can be either a methyl or ethyl radical. Dyestuffs obtained from VII and identical couplers used for V and VI show very inferior non-bleeding properties.

It has been found that the presence of at least two chlorine atoms in the phenylene ring of the coupling component is essential to the maintenance of the properties of non-bleending, light-fastness and tinctorial strength. For instance when the phenylene ring of the coupling component has only one chlorine atom the resulting pigment, namely:

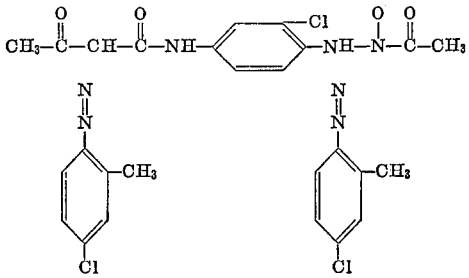

is found to have very poor light-fastness and moderate non-bleeding and coloring properties.

Even when the phenylene ring of the coupling component is further substituted by adding a methoxy radical the dyestuff, represented by the formula

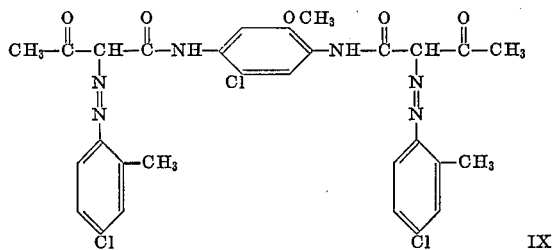

is shown to have very poor non-bleeding characteristics while the tinctorial strength and light-fastness are only fair. Moreover the color is a dirty orange.

The presence of other substituents on the ring of the coupler component show similar adverse effects. Thus when 2-nitro-4-chloroaniline is coupled with N,N'-(2,5-dichloro-p-phenylene) - bis-acetoacetamide the resultant pigment bleeds easily in organic solvents. Also the amine, 2,5-dimethoxy-aniline, when coupled with N,N'-(2,5-dichloro-p-phenylene)-bis-acetoacetamide gives a pigment having a very poor light-fastness.

The disazo compounds suitable for use in connection with the present invention may be prepared by any suitable means, such as treating the corresponding aniline derivative with sodium nitrite and mineral acid while cooling the solution. The coupling component may also be prepared from readily accessible starting materials. For ininstance, the coupling agent for the particular yellow dyestuff mentioned above may be prepared by reacting 2 moles of ethylacetoacetate with 1 mole of 2,5-dichloro-p-phenylenediamine in an inert solvent such as toluene or xylene, in the presence of a catalyst, such as triethanolamine.

The dyestuffs may be formed by adding an aqueous solution of the disazo component to an aqueous suspension of thecoupling component in the presence of a surfactant, if desired.

Th new dyestuffs are greenish to reddish-yellow pigments with high coloring strength, excellent fastness to solvents, and very good fastness to light. They are, therefore, especially suitable for plastics, printing inks, lacquers, paints, pads for dyeing of textiles and also for spin dyeing viscose rayon and acetate rayon.

This invention will be more fully described by the following examples. The invention is not to be regarded, however, as restricted in any way by these examples and they are to serve merely as illustrations. In these examples and throughout the specification, "parts" and "percentages" are given by weight unless specifically provided otherwise.

EXAMPLE I

Seventy-one parts of 4-chloro-2-methylaniline is dissolved by warming in 875 parts of water and 425 parts of 5 N hydrochloric acid. The resultant solution is cooled to 0° C., and a solution of 35 parts of sodium nitrite in 100 parts of water is gradually added with good agitation below the surface of the mixture. The whole is then stirred for an hour and filtered to remove a small amount of insoluble material.

The diazo solution so prepared is added gradually to a suspension of N,N′-(2,5-dichloro-p-phenylene)-bis-acetoacetamide prepared by dissolving 36.3 g. of the latter compound in 4.5 liters of solution containing 285 g. of 20% NaOH and precipitating the diarylide with 45 ml. of acetic acid in the presence of 12.5 g. of lauric diethanolamine under vigorous agitation. 175 g. of sodium acetate is added to maintain the pH at approximately 5.

After the coupling reaction is completed, the mixture is heated to 75° C., filtered and washed with water. Impurities are then removed by treatment of the pigment with an organic solvent such as pyridine, xylene, etc. The resulting product has the Formula IV given above.

EXAMPLE II

Procedure for coupling 2,5-dimethyl-4-chloroaniline (Ia) onto N,N′-(2,5-dichloro-p-phenylene)-bis-acetoacetamide (IIa): 6.25 g. of Ia is stirred for ½ hour with 70 ml. of water and 34 ml. of 5 N HCl at 60° C. The mixture is cooled to 0–5° C. and 2.8 g. of sodium nitrite dissolved in about 15 ml. water is added beneath the surface of the liquid. After stirring for about one hour, the solution is filtered and diluted to 140 ml. with ice and water. Excess nitrous acid is destroyed by the addition of a small amount of sulfamic acid.

In a separate container, 6.9 g. of IIa is dissolved by stirring with 11.2 g. of 20% sodium hydroxide in 150 ml. of water. The solution is filtered and diluted to about 350 ml. Twelve grams of 20% sodium hydroxide and 14 g. of sodium acetate in 40–50 ml. of water are added. Advantageously, a small amount of detergent is also added, such as 1 g. of "Detergent 1011" marketed by E. F. Drew and Co. The diarylide (IIa) is then precipitated in a finely divided form by the addition of 11.6 g. of glacial acetic acid in about 25 ml. water under vigorous agitation. The pH at this point is about 5–5.5.

The diazonium solution of Ib prepared above is added gradually to IIa, maintained in suspension by vigorous agitation at 15–40° C. About two hours are required for the addition. A solution of 0.5 g. of an emulsifying agent such as "Emulphor ON–870" in about 10 ml. water is added during the coupling and the mixture is stirred without temperature control until a test for unreacted diazonium compound is negative. The batch is next heated to 50° C. and stirred for one hour. The resultant pigment is filtered, washed with water to insure removal of chloride ions, and dried at 40°–50° C. Impurities are extracted by repeated slurrying with tetrahydrofuran and filtering until a sample of the pigment does not bleed in boiling xylene. The filter cake is then washed with water to effect complete removal of tetrahydrofuran and dried at 40°–50° C. The resulting pigment has the formula V shown above.

EXAMPLE III

Procedure for coupling 2-methoxy-4-chloroaniline (Ib) onto N,N′-(2,5-dichloro-p-phenylene)-bis-acetoacetamide (IIa): 50.6 g. of Ib is stirred with 550 ml. water and 272 ml. of 5 N hydrochloric acid at about 60° C. for ½ hour. The mixture is cooled to 0°–5° and 22.4 g. sodium nitrite dissolved in 75 ml. water is added gradually below the surface. After stirring for about one hour, the batch is diluted to 1100 ml. and filtered. Excess nitrous acid is destroyed with a small amount of sulfamic acid.

In a separate container, 55.2 g. of IIa is dissolved in 90 g. of 20% sodium hydroxide and about 1000 ml. of water. The solution is clarified and diluted to about 2900 ml. Eleven grams of a detergent, such as "Detergent 1011" (E. F. Drew and Co.), 94 g. of 20% sodium hydroxide and 112 g. of sodium acetate in about 500 ml. of water are added, and the diarylide IIa is precipitated in a finely divided form by adding 93 g. of glacial acetic acid in about 200 ml. of water under vigorous agitation. The pH at this point is about 5–5.5.

The diazonium solution prepared above from Ib is added gradually to the IIa maintained in suspension over a period of 4½ hours at 15°–40° C. A solution of a detergent, such as 4 g. of "Emulphor ON–870" in about 25 ml. of water, is added simultaneously. The mixture is then stirred without temperature control until a spot test for unreacted diazonium compound is negative. The batch is then stirred at about 50° C. for one hour, the pigment is filtered and washed chloride-free with water. Impurities are extracted by slurrying with tetrahydrofuran and filtering. The filter cake is then washed with water to remove tetrahydrofuran. The pigment can be used as a wet cake or it can be dried at 40–50° C. for subsequent use. The resulting pigment has the Formula VI shown above.

EXAMPLE IV

The procedure of Example II is repeated for the coupling of 2-methyl-4-chloroaniline with N,N′-(2,5-dibromo-p-phenylene)-bisacetoacetamide to give the dyestuff having the formula:

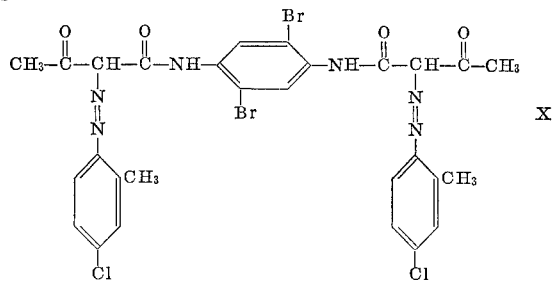

which is a yellow pigment having the excellent properties of lightfastness, tinctorial strength and resistance to organic solvents.

Other dyestuffs of this invention are prepared by using the procedure of Examples I and II in coupling:

(a) 2-methyl-4-chloroaniline with N,N′-(2,3,5-trichloro-p-phenylene)-bisacetoacetamide;
(b) 2-methoxy-4-chloro-5-methylaniline with N,N′-(2,6-dichloro-p-phenylene)-bisacetoacetamide;
(c) 2,5-dimethyl-4-chloroaniline with N,N′-(2,3-dichloro-p-phenylene)-bisacetoacetamide;
(d) 2-methoxy-4-chloroaniline with N,N′-(2,3,5,6-tetrachloro-p-phenylene)-bisacetoacetamide;
(e) 2-methyl-4-chloroaniline with N,N′-(2,3,5-tribromo-p-phenylene)-bisacetoacetamide.

These dyestuffs likewise have the desirable properties described above. However, the dyestuffs of Formulas IV, V, VI and X are particularly preferred for their colors and superior properties.

While certain features of this invention have been described in detail with respect to various embodiments thereof, it will, of course, be apparent that other modifications may be made within the spirit and scope of this invention to the exact details shown above except insofar as they are defined in the following claims.

The invention claimed is:

1. The water-insoluble disazo dyestuff having the formula:

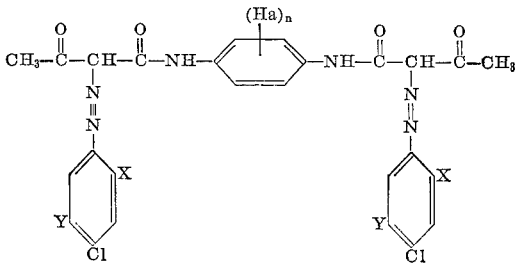

wherein n represents an integer having a value of at least 2 and no more than 4, Ha is a halide atom selected from the class consisting of chlorine and bromine, X is a radical selected from the class consisting of methyl and methoxy, and Y is a radical selected from the class consisting of hydrogen and methyl.

2. The dyestuff of claim 1 having the formula:

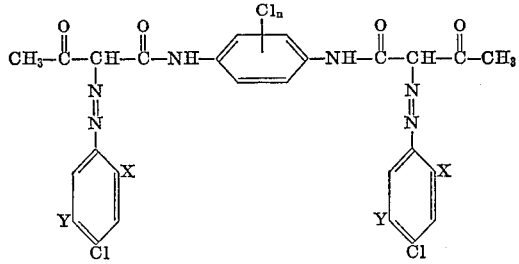

3. The dyestuff of claim 1 having the formula:

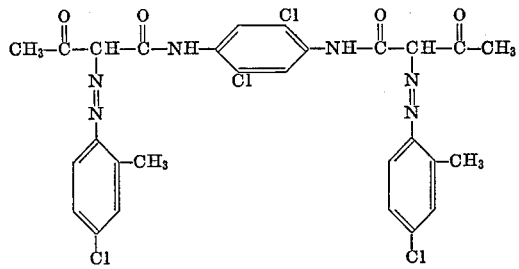

4. The dyestuff of claim 1 having the formula:

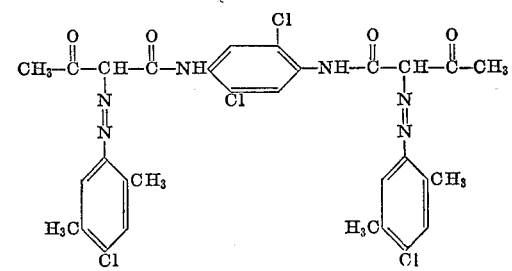

5. The dyestuff of claim 1 having the formula:

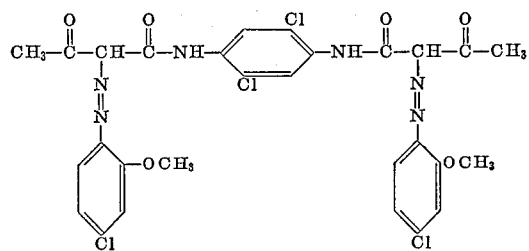

6. The dyestuff of claim 1 having the formula:

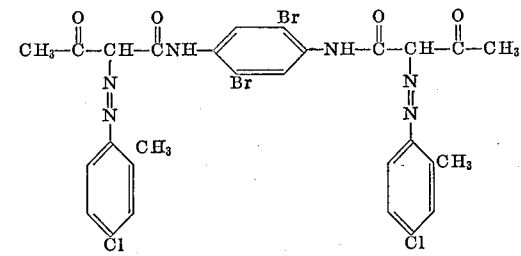

References Cited

UNITED STATES PATENTS

| | | | |
|---|---|---|---|
| 2,153,539 | 4/1939 | Laska et al. | 260—176 |
| 2,361,566 | 10/1944 | Reynolds | 260—176 |
| 2,361,567 | 10/1944 | Reynolds | 260—176 |
| 2,591,470 | 4/1952 | Schmid et al. | 260—176 |
| 2,739,146 | 3/1956 | Weigele et al. | 260—176 |
| 2,936,306 | 5/1960 | Schmid et al. | 260—176 |
| 2,984,660 | 5/1961 | Ribka | 260—176 |

FOREIGN PATENTS 476,227  8/1951  Canada.

FLOYD D. HIGEL, Primary Examiner

U.S. Cl. X.R.

8—4, 41, 50; 106—22, 23, 208; 117—138.8; 260—562, 37